(12) United States Patent
Holland et al.

(10) Patent No.: US 10,474,408 B2
(45) Date of Patent: Nov. 12, 2019

(54) IMAGE DATA PROCESSING PIPELINE BYPASS SYSTEMS AND METHODS

(71) Applicant: Apple Inc., Cupertino, CA (US)

(72) Inventors: Peter F. Holland, Los Gatos, CA (US); Mahesh B. Chappalli, San Jose, CA (US); David L. Bowman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/698,224

(22) Filed: Sep. 7, 2017

(65) Prior Publication Data

US 2019/0073176 A1   Mar. 7, 2019

(51) Int. Cl.
| | | |
|---|---|---|
| *G06T 1/20* | (2006.01) | |
| *G06F 3/14* | (2006.01) | |
| *G09G 5/36* | (2006.01) | |

(52) U.S. Cl.
CPC ............ *G06F 3/14* (2013.01); *G06T 1/20* (2013.01); *G09G 5/363* (2013.01)

(58) Field of Classification Search
None
See application file for complete search history.

(56) References Cited

U.S. PATENT DOCUMENTS

| | | |
|---|---|---|
| 7,385,609 B1 | 6/2008 | Lindholm et al. |
| 8,458,497 B2 | 6/2013 | Du et al. |
| 9,286,647 B2 | 3/2016 | Lum et al. |
| 9,473,778 B2 | 10/2016 | Chou et al. |
| 2005/0053286 A1* | 3/2005 | Chuang .......... H04N 21/440245 382/232 |
| 2006/0023239 A1* | 2/2006 | Ferlitsch ............... G06F 3/1205 358/1.13 |
| 2006/0087553 A1* | 4/2006 | Kenoyer ................ H04N 7/152 348/14.08 |
| 2010/0079445 A1* | 4/2010 | Hendry .................... G06T 1/20 345/418 |
| 2014/0232731 A1* | 8/2014 | Holland ................ G06F 1/3228 345/531 |
| 2014/0292750 A1 | 10/2014 | Lipton et al. |

(Continued)

FOREIGN PATENT DOCUMENTS

EP     0489552 A2    6/1992

*Primary Examiner* — Xiao M Wu
*Assistant Examiner* — Steven Z Elbinger
(74) *Attorney, Agent, or Firm* — Fletcher Yoder P.C.

(57) ABSTRACT

Systems and methods for improving operation of an electronic device, which includes an image data processing pipeline that processes input image data. In the processing pipeline, a first processing block generates first processed image data by performing a first function on the input image data; another one or more processing blocks, which includes a second processing block coupled to a first output of the first processing block, generates second processed image data by performing a second function on the first processed image data when received from the first processing block; and a third processing block coupled to the first output and a second output of the other one or more processing blocks performs a third function on the first processed image data when received from the first processing block and performs the third function on the second processed image data when received from the other one or more processing blocks.

20 Claims, 7 Drawing Sheets

(56) References Cited

U.S. PATENT DOCUMENTS

| | | | |
|---|---|---|---|
| 2015/0379679 A1* | 12/2015 | Wang | G06T 1/20 |
| | | | 345/506 |
| 2016/0125567 A1* | 5/2016 | Yoon | G06T 1/20 |
| | | | 345/505 |
| 2016/0132987 A1* | 5/2016 | Li | G06T 1/20 |
| | | | 345/522 |
| 2016/0292812 A1 | 10/2016 | Wu et al. | |
| 2016/0307540 A1 | 10/2016 | Holland et al. | |
| 2017/0111661 A1* | 4/2017 | Boyce | H04N 19/44 |
| 2017/0186243 A1* | 6/2017 | Shi | G06T 3/40 |
| 2017/0256027 A1* | 9/2017 | Saeed | G06T 1/20 |
| 2017/0352182 A1* | 12/2017 | Wang | G06T 15/005 |
| 2018/0189110 A1* | 7/2018 | Venkatesh | G06F 15/8092 |

* cited by examiner

IMAGE DATA PROCESSING PIPELINE BYPASS SYSTEMS AND METHODS

BACKGROUND

The present disclosure relates generally to image data processing and, more particularly, to implementation of circuitry in an image data processing pipeline.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To present visual representations of information, an electronic device may utilize an electronic display to display one or more images (e.g., pictures or image frames) based on corresponding image data. In particular, the electronic display may adjust luminance of its display pixels based on target luminance indicated by the image data. In some instances, image data may be processed before being using to display a corresponding image, for example, to facilitate improving perceived image quality when the corresponding image is displayed on an electronic display.

To facilitate improving processing latency, image data may be processed using pipelined circuitry, for example, implemented as one or more processing blocks in an image data processing pipeline. However, in some instances, processing image data using pipelined circuitry may limit operational flexibility, for example, when an image data processing pipeline is implemented with a single data path through its processing blocks. Moreover, in some instances, processing image data using pipelined circuitry may limit power consumption efficiency, for example, when electrical power is supplied to each processing block in an image data processing pipeline regardless of targeted functions to be performed by the image data processing pipeline.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to processing image data. In some instances, an electronic device may process image data to facilitate improving perceived image quality when a corresponding image is displayed. To facilitate improving processing latency, in some instances, image data may be processed using hardware techniques, for example, implemented based on circuitry (e.g., logic gates and/or circuit connections) formed in the electronic device.

However, in some instances, processing image data using pipelined circuitry may limit operational flexibility. In particular, in some instances, functions targeted for performance during different passes through an image data processing pipeline may vary. As such, fixedly implementing a single data path through an image data processing pipeline may limit execution order of functions provided by its processing blocks.

In some instances, operations performed during a pass may be adjusted by instructing one or more processing blocks in the image data processing pipeline to operate in a bypass mode. Nevertheless, when in the bypass mode, a processing block may remain operational, for example, to generate output image data by applying a unity scaling to input image data. In other words, electrical power may be supplied a processing block even when instructed to operate in a bypass mode. As such, in addition to potentially limiting operational flexibility, fixedly implementing a single data path through an image data processing pipeline may limit ability to adjust power consumption attributable to passes through the image data processing pipeline, for example, when functions targeted for performance during a pass include a subset of the functions provided by the image data processing pipeline.

Accordingly, the present disclosure provides techniques to facilitate improving operational flexibility and/or power consumption efficiency of one or more image data processing pipelines implemented in an electronic device. In some embodiments, an image data processing pipeline may be implemented with multiple data paths, for example, selectable based at least in part on target functions to be during a pass (e.g., cycle) through the image data processing pipeline. To facilitate selecting between multiple data paths, in some embodiments, a processing block may include a de-multiplexer coupled between its image data processing circuitry (e.g., one or more processing sub-blocks) and each of the multiple data paths. In other words, the de-multiplexer may enable the processing block to selectively output processed image data determined by its image data processing blocks to a subset (e.g., one) of the multiple data paths. In this manner, execution order of functions provided by processing blocks in an image data processing pipeline may be dynamically adjusted between different passes, which at least in some instances may facilitate improving operational flexibility of the image data processing pipeline and, thus, an electronic device in which the image data processing pipeline is implemented.

To facilitate improving power consumption efficiency, in some embodiments, an image data processing pipeline may selectively connect and disconnect electrical power to one or more of its processing blocks. To facilitate selectively connecting and disconnecting electrical power, in some embodiments, the image data processing pipeline may include switching devices electrically coupled between a power source and its processing blocks. In some embodiments, an image data processing pipeline may selectively connect and disconnect electrical power based at least in part on target functions to be performed during a pass through the image data processing pipeline. In other words, since selected based at least in part on the target functions, the image data processing pipeline may selectively connect and disconnect electrical power based at least in part on which of the multiple data paths is selected. In this manner, instead of merely operating in a bypass mode, electrical power may be selectively disconnected from processing blocks that provide untargeted functions, which at least in some instances may facilitate improving power consumption efficiency of the image data processing pipeline and, thus, an electronic device in which the image data processing pipeline is implemented.

BRIEF DESCRIPTION OF THE DRAWINGS

Various aspects of this disclosure may be better understood upon reading the following detailed description and upon reference to the drawings in which.

DETAILED DESCRIPTION

Figure 1:
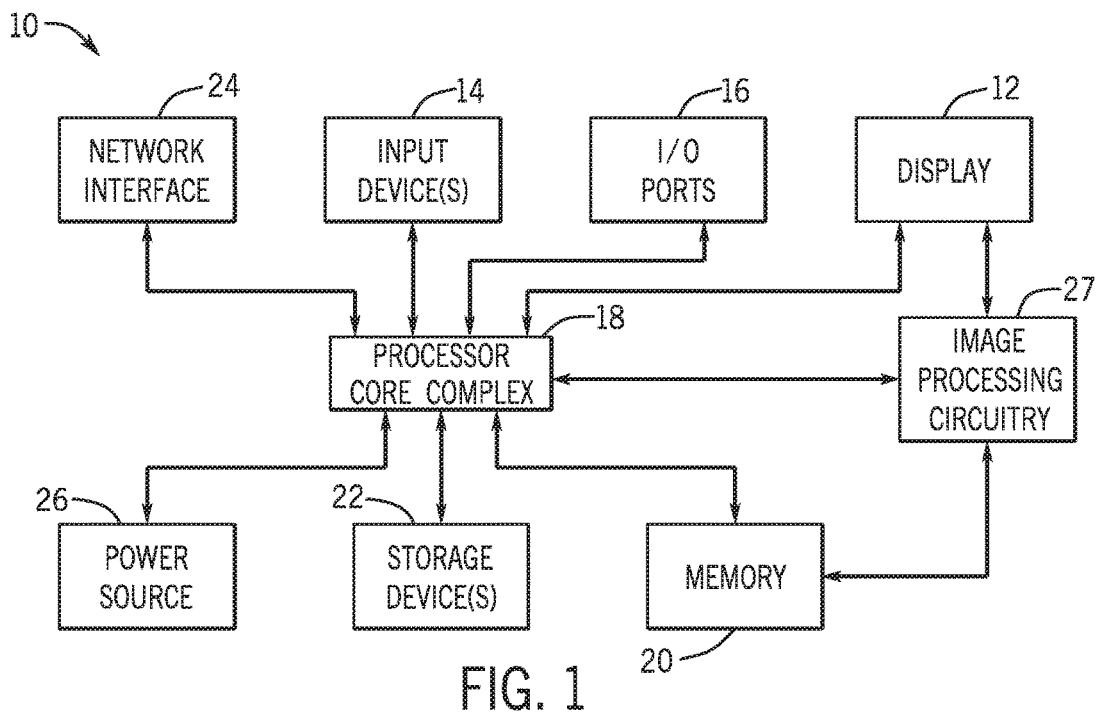
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to processing image data, for example, before the image data is used to display a corresponding image (e.g., picture or image frame) on an electronic display. In some instances, an electronic device may process image data to facilitate improving perceived image quality when a corresponding image is displayed, for example, by reducing likelihood of the image being displayed with a perceivable visual artifact. Additionally, in some instances, image data may be processed using software techniques, for example, implemented based on execution of instructions stored in a tangible, non-transitory, computer-readable medium.

To facilitate improving processing latency, image data may additionally or alternatively be processed using hardware techniques, for example, implemented based on circuitry (e.g., logic gates and/or circuit connections) formed in an electronic device. In some instances, circuitry may be organized into processing blocks based on provided function (e.g., type of operation performed). For example, a rotator block may be implemented with circuitry that rotates input image data, a scaler block may be implemented with circuitry that scales input image data, and a statistics block may be implemented with circuitry that determines statistics indicative of input image data characteristics. Additionally, to implement an image data processing pipeline in an electronic device, processing blocks may be pipelined via circuit connections to implement one or more data paths. For example, to implement a first (e.g., primary) data path through a memory-to-memory scaler/rotator (MSR) pipeline, circuit connections may be formed to communicatively couple an output of the rotator block to an input of the scaler block and to communicatively couple an output of the scaler block to an input of the statistics block.

However, in some instances, processing image data using pipelined circuitry may limit operational flexibility. For example, when fixedly implemented with the first data path, each pass (e.g., cycle) through the memory-to-memory scaler/rotator pipeline may result in image data following through the rotator block, the scaler block, and the statistics block in that order, thereby limiting execution of a scale function to between execution of a rotate function and execution of a statistics function. In other words, fixedly implementing a single data path through an image data processing pipeline may limit execution order of functions provided by its processing blocks and, thus, operational flexibility of the image data processing pipeline.

Moreover, in some instances, functions targeted for performance during different passes through an image data processing pipeline may vary. For example, the memory-to-memory scaler/rotator pipeline may be instructed to perform only a rotate function during a first pass while being instructed to perform both a rotate function and a scale function during a second pass. In some instances, operations performed during a pass through an image data processing pipeline may be adjusted by instructing one or more processing blocks in the image data processing pipeline to operate in a bypass mode. For example, during the first pass through the memory-to-memory scaler/rotator pipeline, the scaler block may be instructed to operate in a bypass mode such that the scaler block outputs image data based on unity scaling of input image data, thereby enabling the memory-to-memory scaler/rotator pipeline to essentially perform a rotate operation without performing a scale operation during the first pass.

Nevertheless, in some instances, electrical power may continue to be supplied to each processing block during a pass through an image data processing pipeline regardless of targeted functions. For example, the scaler block may be supplied electrical power to enable the scaler block to apply any scaling including a unity scaling. In other words, electrical power may be supplied a processing block even when the processing block is instructed to operate in a bypass mode. As such, in addition to potentially limiting operational flexibility, fixedly implementing a single data path through an image data processing pipeline may limit ability to adjust power consumption attributable to passes through the image data processing pipeline, for example, when functions targeted for performance during a pass include a subset of the functions provided by the processing blocks in the image data processing pipeline.

Accordingly, the present disclosure provides techniques to facilitate improving operational flexibility and/or power consumption efficiency of one or more image data processing pipelines implemented in an electronic device, for example, by enabling execution order of functions provided by processing blocks and/or power consumption attributable to different passes to be dynamically adjusted. In some embodiments, an image data processing pipeline may be implemented with multiple selectable data paths. For example, in addition to the first (e.g., primary) data path, the memory-to-memory scaler/rotator pipeline may be implemented with a second (e.g., bypass) data path that directly couples an output of the rotator block to an input of the statistics block.

To facilitate improving operational flexibility, in some embodiments, the multiple data paths may be selectable based at least in target functions to be performed during passes through the image data processing pipeline. To facilitate selecting between multiple data paths, in some embodiments, one or more processing blocks in an image data processing pipeline may include a de-multiplexer coupled between its image data processing circuitry (e.g., one or more processing sub-blocks) and each of the multiple data paths. For example, the rotator block may include processing sub-blocks that perform a rotate operation on input image data to determine processed (e.g., rotated) image data. Additionally, the rotator block may include a de-multiplexer coupled between its processing sub-blocks and both the first data path and the second data path.

In some embodiments, the de-multiplexer in a processing block may selectively output processed image data determined by the processing sub-blocks to a subset (e.g., one) of the multiple data paths based at least in part on target functions to be subsequently performed during a pass through the image data processing pipeline. For example, since a scale function is not targeted for performance during a first pass through the memory-to-memory scaler/rotator pipeline, the de-multiplexer in the rotator block may select the second data path, thereby bypassing the scaler block. On the other hand, since a scale function is targeted for performance after a rotate operation during a second pass through the memory-to-memory scaler/rotator pipeline, the de-multiplexer in the rotator block may select the first data path, thereby enabling rotated image data to be supplied to the scaler block. In this manner, execution order of functions provided by processing blocks in an image data processing pipeline may be dynamically adjusted between different passes, which at least in some instances may facilitate improving operational flexibility of the image data processing pipeline and, thus, an electronic device in which the image data processing pipeline is implemented.

To facilitate improving power consumption efficiency, in some embodiments, an image data processing pipeline may selectively connect and disconnect electrical power to one or more of its processing blocks. To facilitate selectively connecting and disconnecting electrical power, in some embodiments, the image data processing pipeline may include switching devices electrically coupled between a power source and its processing blocks. For example, the memory-to-memory scaler/rotator pipeline may include a switching device electrically coupled between the scaler block and the power source.

In some embodiments, an image data processing pipeline may selectively connect and disconnect electrical power based at least in part on target functions to be performed during a pass through the image data processing pipeline. For example, since both a scale function and a rotate function are targeted for performance during a second pass, the memory-to-memory scaler/rotator pipeline may instruct the switching device to maintain a closed (e.g., connected) position, thereby enabling electrical power to be supplied from the power source to the scaler block. On the other hand, since a scale function is not targeted for performance during a first pass, the memory-to-memory scaler/rotator pipeline may instruct the switching device to maintain an open (e.g., disconnected) position, thereby blocking supply of electrical power from the power source to the scaler block. In this manner, instead of merely operating in a bypass mode, electrical power may be selectively disconnected from processing blocks that provide untargeted functions, which at least in some instances may facilitate improving power consumption efficiency of the image data processing pipeline and, thus, an electronic device in which the image data processing pipeline is implemented.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. In some embodiments, the local memory 20 and/or the main memory storage device 22 may be tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may be communicatively coupled to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying images (e.g., in one or more image frames). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
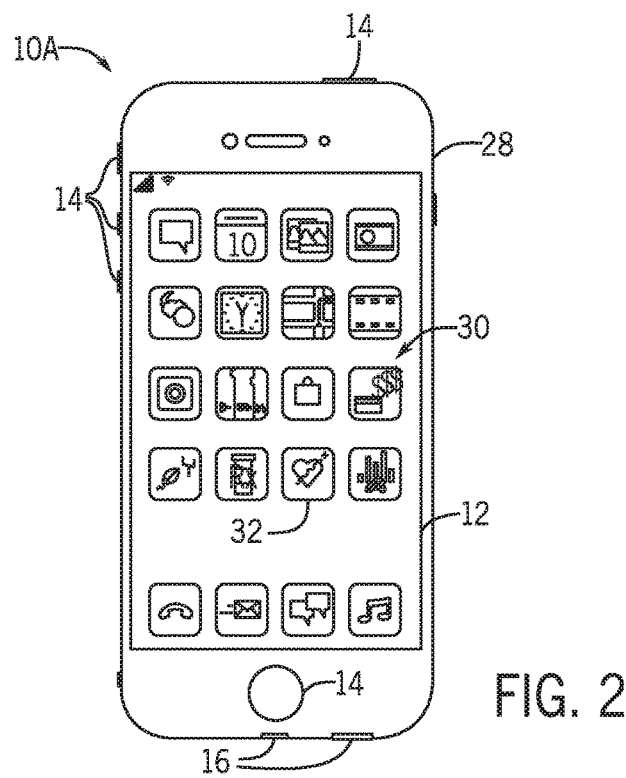
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
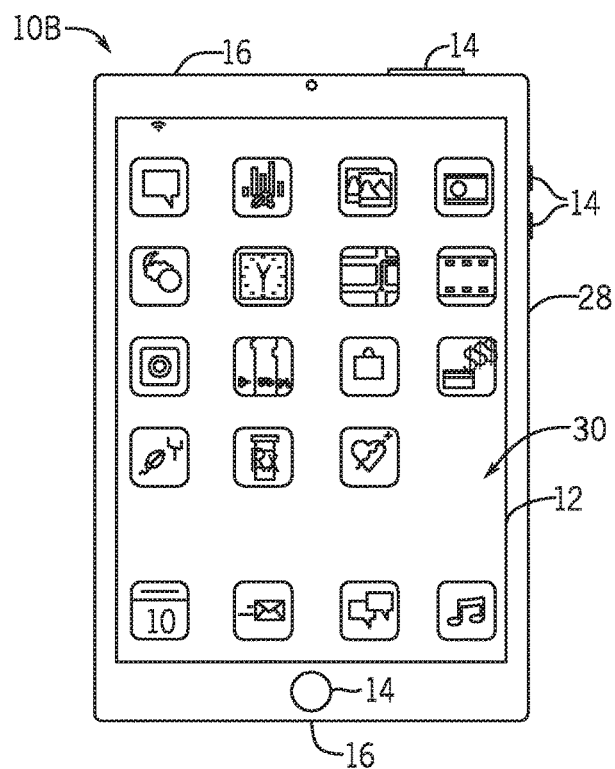
FIG. 3 is another example of the electronic device of FIG. 1, in accordance with an embodiment.
Figure 4:
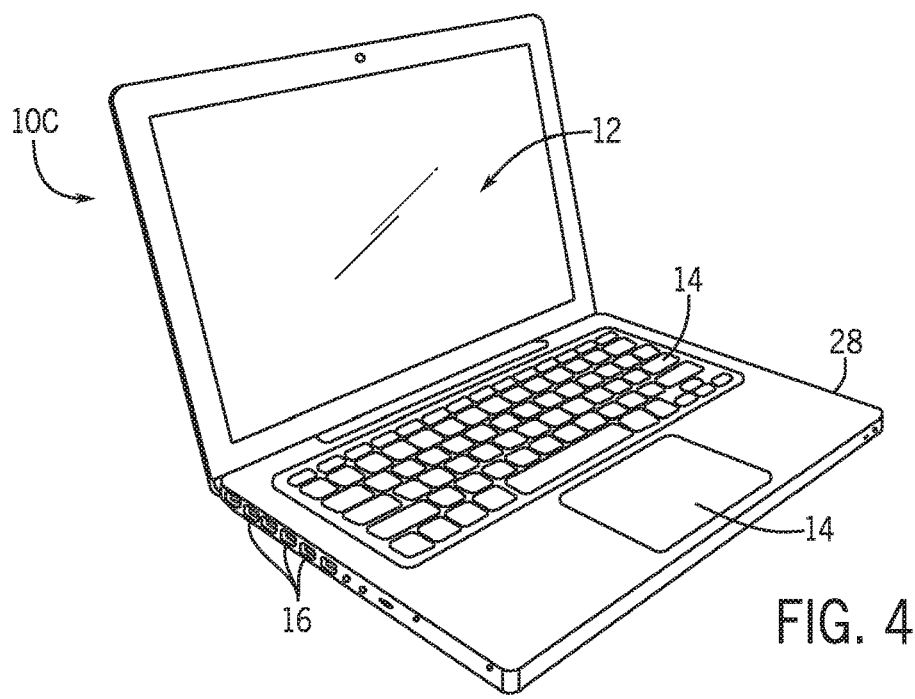
FIG. 4 is another example of the electronic device of FIG. 1, in accordance with an embodiment.
Figure 5:
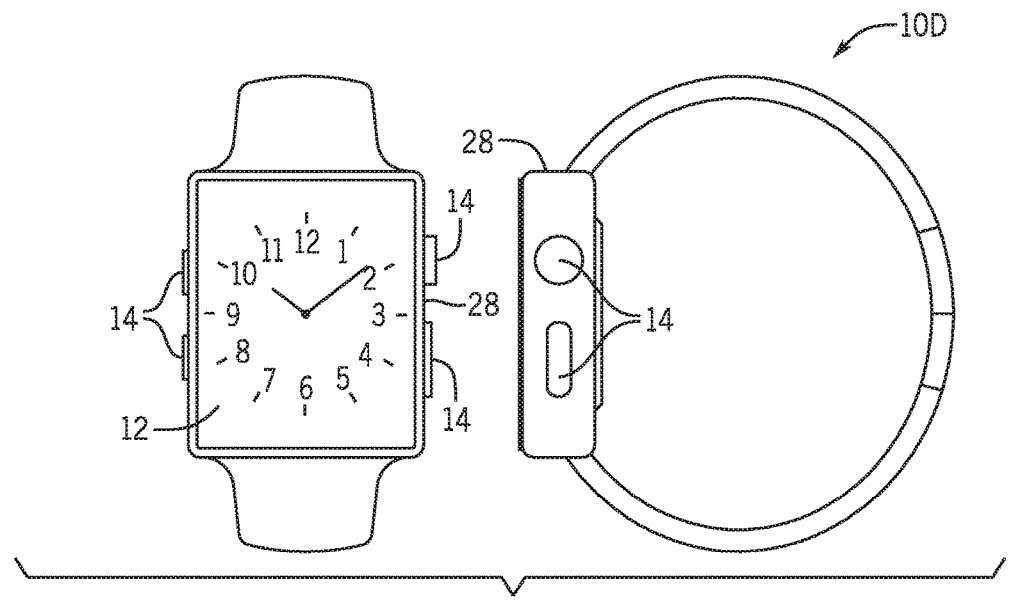
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data, for example, received from the processor core complex 18 and/or the image processing circuitry 27. Additionally, as described above, image data may be processed before being used to display a corresponding image, for example, to facilitate improving perceived image quality when the corresponding image is displayed on the electronic display 12. To process image data, in some embodiments, pipelined circuitry may be implemented in the electronic device 10, for example, as one or more image data processing pipelines.

Figure 6:
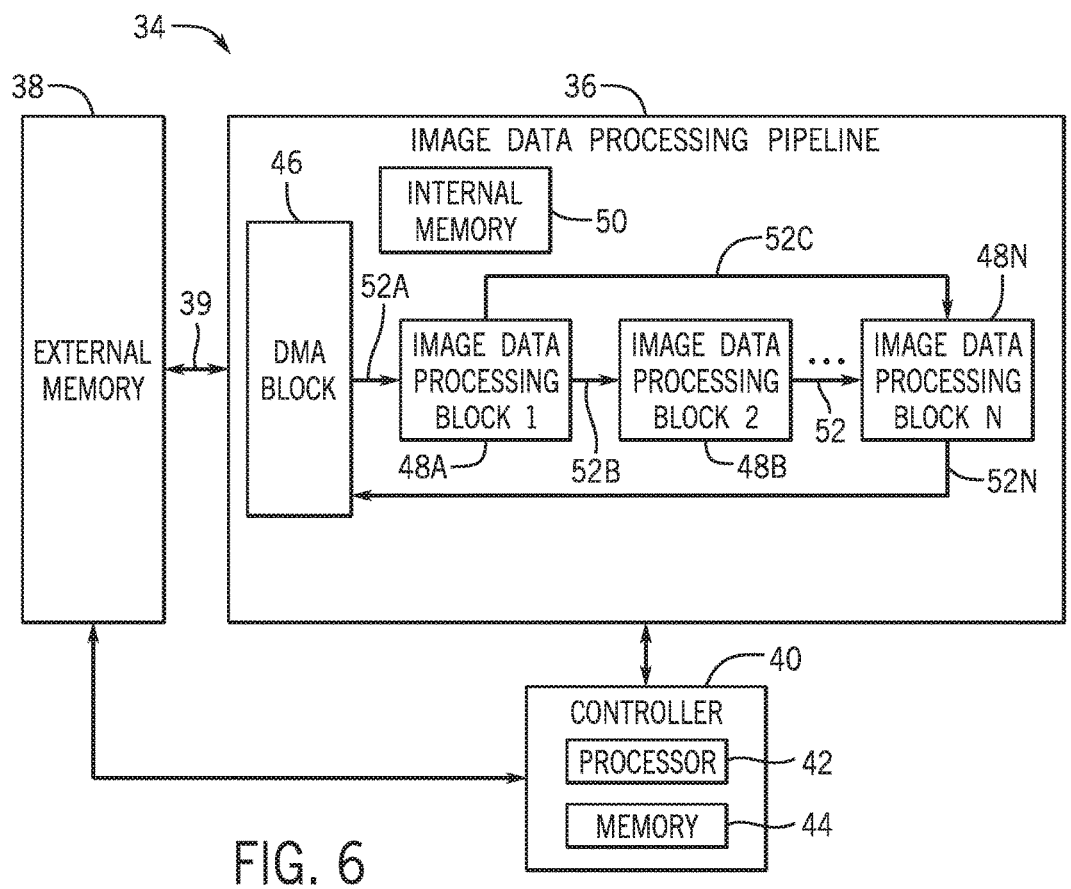
FIG. 6 is a block diagram of a portion of the electronic device of FIG. 1 including an image data processing pipeline, in accordance with an embodiment.

To help illustrate, a portion 34 of the electronic device 10 including an image data processing pipeline 36 is shown in FIG. 6. In some embodiments, the image data processing pipeline 36 may be implemented by circuitry (e.g., logic gates and/or circuit connections) formed in the electronic device 10, circuitry formed in the electronic display 12, or a combination thereof. Additionally or alternatively, the image data processing pipeline 36 may be implemented in the processor core complex 18, the image processing circuitry 27, a timing controller (TCON) in the electronic display 12, or any combination thereof.

Although a single image data processing pipeline 36 is depicted, in some embodiments, an electronic device 10 may include multiple image data processing pipelines 36. Additionally, in some embodiments, different image data processing pipeline 36 may provide at least partially differing functions. For example, image data processing pipelines 36 implemented in an electronic device 10 may include a video encoding pipeline, a video decoding pipeline, a memory-to-memory scaler/rotator (MSR) pipeline, a display pipeline, or any combination thereof.

In any case, as depicted, the portion 34 of the electronic device 10 also includes external memory 38 and a controller 40. In some embodiments, the controller 40 may control operation of the image data processing pipeline 36 and/or the external memory 38. For example, the controller 40 may be a direct memory access (DMA) controller that coordinates access to external memory 38 based on indications (e.g., signals) that data is to be stored in external memory 38 and/or indications that data is to be retrieved from external memory 38.

To facilitate controlling operation, the controller 40 may include a controller processor 42 and controller memory 44. In some embodiments, the controller processor 42 may execute instructions stored in the controller memory 44. Thus, in some embodiments, the controller processor 42 may be included in the processor core complex 18, the image processing circuitry 27, a timing controller in the electronic display 12, a separate processing module, or any combination thereof. Additionally, in some embodiments, the controller memory 44 may be included in the local memory 20, the main memory storage device 22, the external memory 38, a separate tangible, non-transitory, computer readable medium, or any combination thereof.

The image data processing pipeline 36 may be communicatively coupled to the external memory 38 via one or more communication busses 39 (e.g., DMA channels), for example, to enable the image data processing pipeline 36 to retrieve image data from the external memory 38 and/or store image data to the external memory 38. In other words, the external memory 38 may store image data, for example, to facilitate communication between image data processing pipelines 36. Thus, in some embodiments, the external memory 38 may be included in local memory 20, the main memory storage device 22, a separate tangible, non-transitory, computer readable medium, or any combination thereof.

To facilitate communication with the external memory 38, the image data processing pipeline 36 may include a direct memory access (DMA) block 46. For example, the direct memory access block 46 may retrieve (e.g., read) image data from external memory 38 for processing by the image data processing pipeline 36. Additionally or alternatively, the direct memory access block 46 may store (e.g., write) processed image data determined by the image data processing pipeline 36 to external memory 38. To facilitate processing image data, in some embodiments, the image data processing pipeline 36 may include internal memory 50, for example, implemented as frame buffer or a tile buffer.

As described above, the image data processing pipeline 36 may be implemented by pipelined circuitry that operates to perform various functions used for image data processing. To simplify discussion, the functions (e.g., types of operations) provided by the image data processing pipeline 36 are divided between various image data processing blocks 48 (e.g., circuitry or modules). For example, when the image data processing pipeline 36 is a memory-to-memory scaler/rotator (MSR) pipeline, the image data processing blocks 48 may include a rotator block, a convert block, a scaler block, a color manager block, a revert block, a dither block, a statistics block, or any combination thereof. Additionally, when the image data processing pipeline 36 is a display pipeline, the image data processing blocks 48 may include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

To facilitate pipelining image data processing blocks 48, circuit connections 52 (e.g., wires or conductive traces) may be formed in the image data processing pipeline 36. For example, a first circuit connection 52A may couple an output of the direct memory access block 46 to an input of a first image data processing block 48A, a second circuit connection 52B may couple an output of the first image data processing block 48A to an input of a second image data processing block 48B, and so on with an Nth circuit connection 52N that communicatively couples an output of an Nth image data processing block 48N to an input of the direct memory access block 46. Additionally, a third circuit connection 52C may couple the output of the first image data processing block 48A to an input of the Nth image data processing block 48N.

In other words, one or more circuit connections 52 may be formed in the image data processing pipeline 36 to implement a data path through the image data processing pipeline 36. In fact, in some embodiments, an image data processing pipeline 36 may be implemented with multiple selectable data paths. For example, image data may be communicated from the first image data processing block 48A to the Nth image data processing block 48N via either a first (e.g., primary) data path that includes the second circuit connection 52B or a second (e.g., bypass) data path that includes the third circuit connection 52C. To facilitate selecting between multiple data paths, in some embodiments, an image data processing blocks 48 may operate to selectively output image data to a subset (e.g., one) of the circuit connections 52 coupled to its output.

Figure 7:
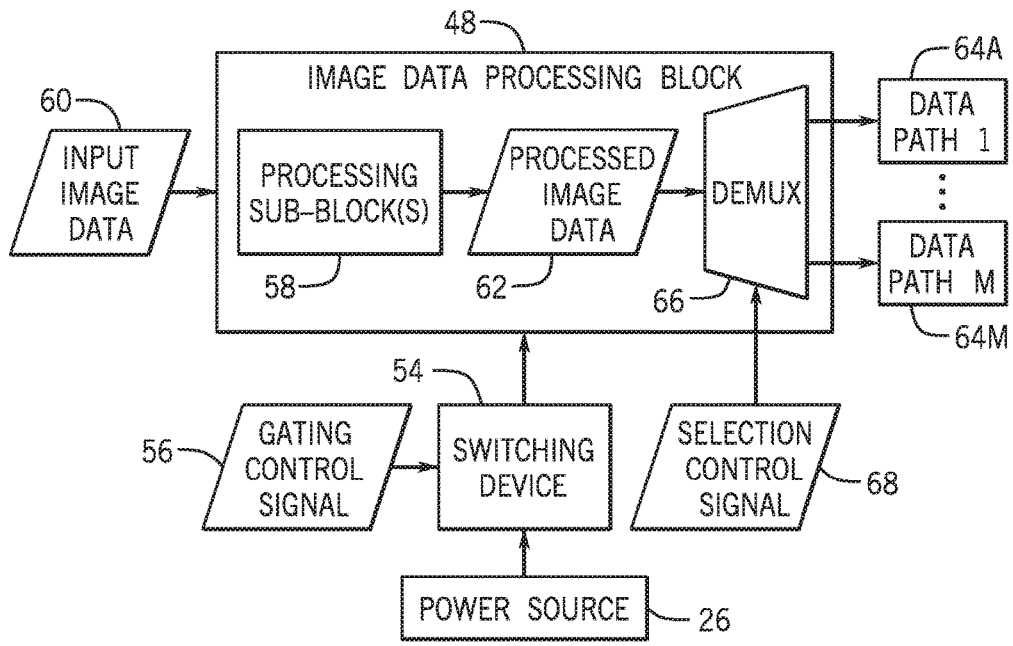
FIG. 7 is block diagram of an image data processing block in the image data processing pipeline of FIG. 6, in accordance with an embodiment.

To help illustrate, an example of an image data processing block 48, which may be implemented in an image data processing pipeline 36, is shown in FIG. 7. As described above, an image data processing block 48 may be implemented with circuitry that operates to perform a specific function. Since implemented using circuitry, the image data processing block 48 may operate when electrical power is received from the power source 26. To facilitate controlling supply of electrical power, a switching device 54 (e.g., a mechanical switch, an electro-mechanical switch, or a transistor) may be electrically coupled between the power source 26 and the image data processing block 48.

In some embodiments, the switching device 54 may selectively connect and disconnect electrical power based at least in part on a gating control signal 56. For example, when the gating control signal 56 is a logic low, the switching device 54 may maintain an open position, thereby blocking supply of electrical power from the power source 26 to the image data processing block 48. On the other hand, when the gating control signal 56 is a logic high, the switching device 54 may maintain a closed position, thereby enabling supply of electrical power from the power source 26 to the image data processing block 48.

As will be described in more detail below, selectively connecting and disconnecting electrical power to one or more image data processing blocks 48 in an image data processing pipeline 36 may facilitate improving power consumption efficiency. In some embodiments, electrical power may be selectively connected and disconnected based at least in part on target functions to be performed during a pass through the image data processing pipeline 36, for example, as determined by the controller 40. Thus, in some embodiments, the controller 40 may output the gating control signal 56 supplied to the switching device 54.

To facilitate performing a function when electrical power is received from the power source 26, the image data processing block 48 may include one or more processing sub-blocks 58 (e.g., image data processing circuitry) that each performs a sub-function. For example, when a rotator block, the image data process block 48 may include a first processing sub-block 58 that operates to perform a ninety degree rotation, a second processing sub-block 58 that operates to perform a one-hundred eighty degree rotation, and a third processing sub-block 58 that operates to perform a two-hundred seventy degree rotation. By processing input image data 60 using its one or more processing sub-blocks 58, the image data processing block 48 may determine processed image data 62. For example, when the image data processing block 48 is a rotator block, the processing sub-blocks 58 may rotate the input image data 60 to determine processed image data 62 (e.g., rotated image data).

After processing, the image data processing block 48 may output processed image data 62 to a circuit connection 52 included in a data path 64. In some embodiments, an output of an image data processing block 48 may be coupled to multiple circuit connections 52 each included in a different data path 64. For example, the output of the image data processing block 48 may be coupled to a circuit connection 52 included in a first data path 64A and a circuit connection 52 included in an Mth data path 64M. In some embodiments, the image data processing block 48 may be coupled to two data paths 64, for example, a primary data path and a bypass data path. In other embodiments, the image data processing block 48 may be coupled to more than two data paths 64.

When coupled to multiple selectable data paths 64, the image data processing block 48 may include a de-multiplexer 66 coupled between its processing sub-blocks 58 and each of the multiple data paths 64. In some embodiments, the de-multiplexer 66 may selectively output the processed image data 62 to a subset of the multiple data paths 64 based at least in part on a selection control signal 68. For example, when the selection control signal 68 is a logic low, the de-multiplexer 66 may output the processed image data 62 to the first data path 64A (e.g., primary data path). On the other hand, when the selection control signal 68 is a logic high, the de-multiplexer 66 may output the processed image data 62 to the Mth data path 64M (e.g., bypass data path).

As will be described in more detail below, selectively outputting processed image data 62 to a subset of data paths 64 coupled to an image data processing block 48 may facilitate improving operational flexibility of an image data processing pipeline 36 that includes the image data processing block 48. In some embodiments, selectively outputting processed image data 62 to a subset of multiple possible data paths 64 may be based at least in part on target functions to be performed during a pass through the image data processing pipeline 36, for example, as determined by the controller 40. Thus, in some embodiments, the controller 40 may output the selection control signal 68 supplied to the de-multiplexer 66.

In any case, to facilitate improving operational flexibility and/or power consumption efficiency, one or more image data processing blocks 48 in an image data processing pipeline 36 may be implemented in accordance with the above-described techniques. For example, with regard to FIG. 6, a switching device 54 may be electrically coupled between the power source 26 and each image data processing block 48 in the image data processing pipeline 36. In this manner, supply of electrical power to the image data processing blocks 48 during passes through the image data processing pipeline 36 may be relatively (e.g., substantially) independently controlled. For example, when the first image data processing block 48A outputs processed image data 62 to the third circuit connection 52C instead of the second circuit connection 52B during a pass, a first switching device 54 may be instructed to connect electrical power to the first image data processing block 48A and a second switching device 54 may be instructed to disconnect electrical power from the second image data processing block 48B. In other words, at least in some instances, implementing in this manner may facilitate improving power consumption efficiency of the image data processing pipeline 36, for example, by enabling power consumption to be reduced when one or more of the functions provided by its image data processing blocks 48 are not targeted for performance during a pass.

In some embodiments, even within the same image data processing pipeline 36, implementation of different image data processing blocks 48 may vary. For example, since its output is coupled to the second circuit connection 52B and the third circuit connection 52C, the first image data processing block 48A may be implemented to include a de-multiplexer 66, thereby enabling the first image data processing block 48A to selectively output processed image data 62 to either a primary data path 64 via the second circuit connection 52B or a bypass data path 64 via the third circuit connection 52C. In other words, at least in some instances, implementing in this manner may facilitate improving operational flexibility of the image data processing pipeline 36, for example, by enabling the image data processing pipeline 36 to vary functions performed during different passes.

However, when an output of the second image data processing block 48B is coupled to a single circuit connection 52, the second image data processing block 48B may be implemented without a de-multiplexer 66. At least in some instances, varying implementation of image data processing blocks 48 may facilitate reducing implementation associated cost of the image data processing pipeline 36 and, thus, an electronic device 10 in which the image data processing pipeline 36 is implemented. For example, implementing an image data processing block 48 without a de-multiplexer 66 may facilitate reducing implementation associated costs, such as component count in the image data processing pipeline 36, size (e.g., physical footprint) of the image data processing pipeline 36, and/or manufacturing steps used to implement the image data processing pipeline 36.

As described above, various types of image data processing pipelines 36, which each provide at least partially varying functions, may be implemented in an electronic device 10. To facilitate improving effectiveness of the techniques disclosed herein, in some embodiments, implementation of the techniques may be tailored to different types of image data processing pipelines 36. For example, the techniques may be tailored to an image data processing pipeline 36 based at least in part on functions provided by its image data processing blocks 48.

Figure 8:
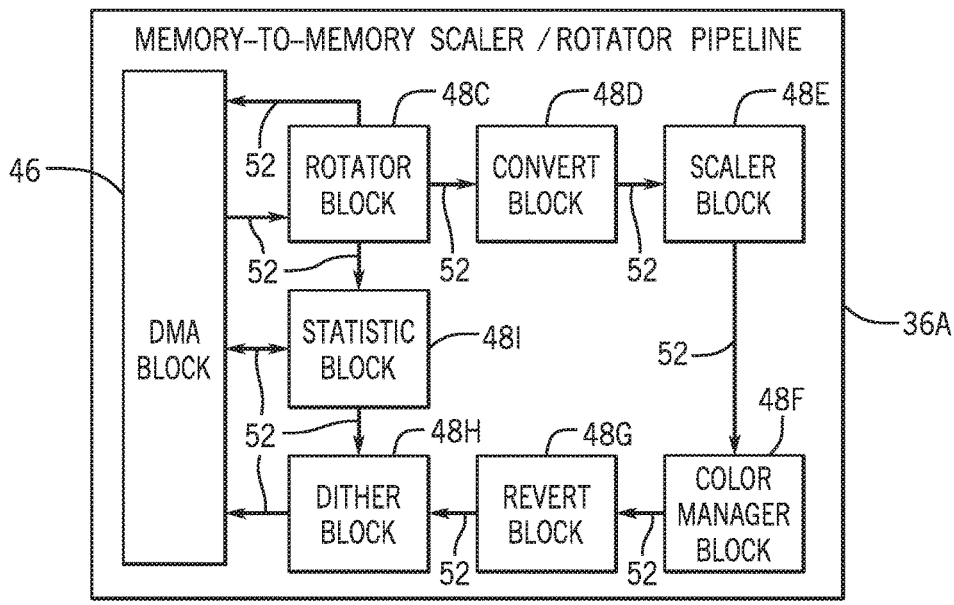
FIG. 8 is a block diagram of a memory-to-memory scaler/rotator (MSR) pipeline, in accordance with an embodiment.
Figure 9:
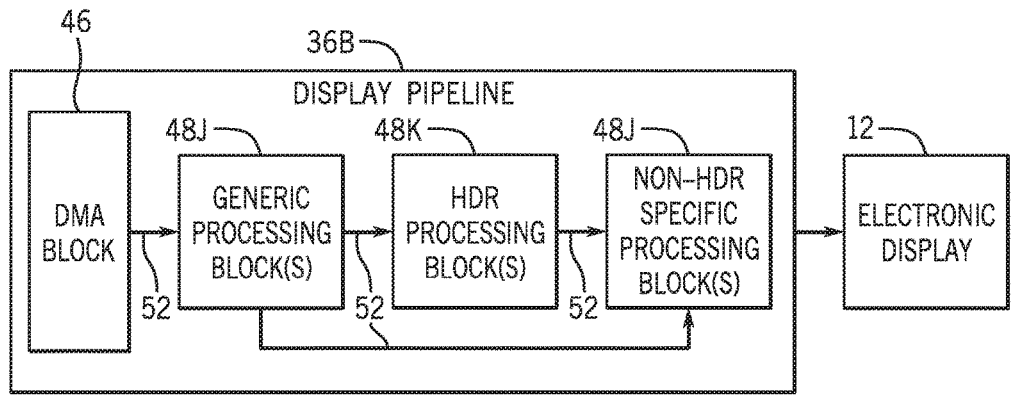
FIG. 9 is a block diagram of a display pipeline, in accordance with an embodiment.

To help illustrate, a first type of image data processing pipeline 36—namely a memory-to-memory scaler/rotator (MSR) pipeline 36A—is shown in FIG. 8. To further illustrate, a second type of an image data processing pipeline 36—namely a display pipeline 36B—is shown in FIG. 9. It should be appreciated that the example image data processing pipelines 36 are merely intended to be illustrative and not limiting.

With regard to FIG. 8, the techniques disclosed herein may be tailored for implementation in the memory-to-memory scaler/rotator pipeline 36A. As depicted, the image data processing blocks 48 implemented in the memory-to-memory scaler/rotator pipeline 36A include a rotator block 48C, a convert block 48D, a scaler block 48E, a color manager block 48F, a revert block 48G, a dither block 48H, and a statistics block 48I. In some embodiments, the rotator block 48C may rotate input image data 60, the scaler block 48E may scale input image data 60, the color manager block 48F may map input image data 60 into a display panel color gamut, the dither block 48H may spatially and/or temporally dither input image data 60, and the statistics block 48I may process input image data 60 to statistics data indicative of characteristics of the input image data 60 and/or characteristics of corresponding content. Additionally, in some embodiments, the convert block 48D may convert input image data 60 from a source format (e.g., representation) to an internal format and the revert block 48G may convert input image data 60 from the internal format back to the source format.

The circuit connections 52 coupled to the image data processing blocks 48 may be formed to implement multiple selectable data paths 64 through the memory-to-memory scaler/rotator pipeline 36A. For example, a primary (e.g., rotate and scale) data path 64 through the memory-to-memory scaler/rotator pipeline 36A may be implemented by the circuit connections 52 that couple an output of the direct memory access block 46 to an input of the rotator block 48C, an output of the rotator block 48C to an input of the convert block 48D, an output of the convert block 48D to an input of the scaler block 48E, an output of the scaler block 48E to an input of the color manager block 48F, an output of the color manager block 48F to an input of the revert block 48G, an output of the revert block 48G to an input of the dither block 48H, and an output of the dither block 48H to an input of the direct memory access block 46. Additionally, a first bypass (e.g., rotate only) data path 64 may be implemented by the circuit connections 52 that couple an output of the direct memory access block 46 to an input of the rotator block 48C and an output of the rotator block 48C to an input of the direct memory access block 46.

Furthermore, a second bypass (e.g., statistics only) data path 64 may be implemented by the circuit connections 52 that couple an output of the direct memory access block 46 to an input of the statistics block 48I and an output of the statistics block 48I to an input of the direct memory access block 46. Since characteristics of image data may change after processing, circuit connections 52 may additionally or alternatively be formed to include the statistics block 48I in other data paths 64 through the memory-to-memory scaler/rotator pipeline 36A. For example, the primary data path 64 may be expanded to include the statistics block 48I via the circuit connections 52 that couple an output of the dither block 48H to an input of the statistics block 48I and an output of the statistics block 48I to an input of the direct memory access block 46. Additionally or alternatively, the first bypass data path 64 may be expanded to include the statistics block 48I via the circuit connections 52 that couple an output of the rotator block 48C to an input of the statistics block 48I and an output of the statistics block 48I to an input of the direct memory access block 46.

To facilitate improving operational flexibility, a subset of the multiple different data paths 64 may be selectively implemented during a pass through the memory-to-memory scaler/rotator pipeline 36A based at least in part on functions targeted for performance during the pass. For example, when the targeted functions for a pass include a rotate function and a scale function, the memory-to-memory scaler/rotator pipeline 36A implement the primary data path 64. To implement the primary data path 64, the rotator block 48C may be instructed to output processed image data 62 to the convert block 48D, for example, without outputting the processed image data 62 directly to the direct memory access block 46 or the statistics block 48I. Additionally, when the targeted functions for a pass include a rotate function, but not a scale function, the memory-to-memory scaler/rotator pipeline 36A may implement the first bypass data path 64, for example, by instructing the rotator block 48C to not output processed image data 62 to the convert block 48D.

Furthermore, when the targeted functions for a pass include only a statistics function, the memory-to-memory scaler/rotator pipeline 36A may implement the second bypass data path 64. To implement the second bypass data path 64, the direct memory access block 46 may be instructed to supply input image data 60 directly to the statistics block 48I, for example, without supplying the input image data 60 to the rotator block 48C. Thus, in some embodiments, a direct memory access block 46 may include a de-multiplexer 66 implemented in a similar manner as a de-multiplexer included in an image data processing block 48.

To facilitate improving power consumption efficiency, electrical power may be selectively supplied to the image data processing blocks 48 during a pass through the memory-to-memory scaler/rotator pipeline 36A based at least in part on functions targeted for performance during the pass. In other words, electrical power may be selectively supplied to each of the image data processing blocks 48 based at least in part on which of the multiple data paths 64 through the memory-to-memory scaler/rotator pipeline 36A is implemented during the pass. For example, when the primary data path 64 is implemented during a pass, electrical power may continuously be supplied to each of the image data processing blocks 48 during the pass.

On the other hand, when a bypass data path 64 is implemented during a pass, electrical power may be disconnected from one or more of the image data processing blocks 48 during the pass. For example, when the first bypass data path 64 is selected for implementation during a pass, electrical power may continuously be supplied to the rotator block 48C, for example, without supplying electrical power to the convert block 48D, the scaler block 48E, the color manager block 48F, the revert block 48G, or the dither block 48H. Additionally, when the second bypass data path 64 is selected for implementation during a pass, electrical power may continuously be supplied to the statistics block 48I, for example, without supplying electrical power to the rotator block 48C, the convert block 48D, the scaler block 48E, the color manager block 48F, the revert block 48G, or the dither block 48H. In this manner, the techniques disclosed herein may be tailored to facilitate improving operational flexibility and/or power consumption efficiency of a memory-to-memory scaler/rotator pipeline 36A and, thus, an electronic device 10 in which the memory-to-memory scaler/rotator pipeline 36A is implemented.

Additionally, with regard to FIG. 9, the techniques disclosed herein may be tailored for implementation in the display pipeline 36B. As depicted, the display pipeline 36B is communicatively coupled to an electronic display 12. In this manner, the electronic display 12 may display an image based at least in part on processed image data 62 (e.g., display image data) determined by the display pipeline 36B, for example, by controlling luminance of its display pixels based at least in part on target luminance indicated by the processed image data 62.

In some embodiments, characteristics of different electronic displays 12 may vary. For example, a first electronic display 12 may be capable of displaying a wider color gamut than a second electronic display 12. As such, while the second electronic display 12 may display standard dynamic range (SDR) content, the first electronic display 12 may be better suited for display of high dynamic range (HDR) content.

To facilitate improving operational flexibility, a display pipeline 36B may be implemented to be compatible with electronic displays 12 having varying characteristics. In other words, in some embodiments, the display pipeline 36B may be implemented to process image data corresponding with standard dynamic range content, image data corresponding with high dynamic range content, or both. To facilitate processing image data corresponding with high dynamic range content, the image data processing blocks 48 implemented in the display pipeline 36B may include one or more non-high dynamic range specific blocks 48J and one or more high dynamic range (HDR) processing blocks 48K. In some embodiments, the high dynamic range processing blocks 48K may operate to process image data corresponding with high dynamic range content and/or wide (e.g., outside sRGB) color gamut content while the non-high dynamic range specific block 48J may operate to process image data regardless dynamic range and/or color gamut of corresponding content.

The circuit connections 52 coupled to the image data processing blocks 48 may be formed to implement multiple selectable data paths 64 through the display pipeline 36B. For example, a first (e.g., SDR only or bypass) data path 64 through the display pipeline 36B may be implemented by circuit connections 52 coupled between non-high dynamic range specific blocks 48J, circuit connections 52 coupled between an output of the direct memory access block 46 and a non-high dynamic range specific block 48J, and/or circuit connections 52 coupled between an output of a non-high dynamic range specific block 48J and an input of the electronic display 12. Additionally, a second (e.g., HDR or primary) data path 64 through the display pipeline 36B may be implemented by the circuit connections 52 included in the first data path 64 as well as circuit connections 52 coupled to an input of a high dynamic range processing blocks 48K and/or circuit connections 52 coupled to an output of a high dynamic range processing blocks 48K.

To facilitate compatibility with various electronic displays 12, a subset of the multiple different data paths 64 may be selectively implemented during a pass based at least in part on characteristics of an electronic display 12 coupled to the display pipeline 36B. For example, when coupled to the second (e.g., SDR only) electronic display 12, the display pipeline 36B may implement the first data path 64. To implement the first data path 64, the direct memory access block 46 may be instructed to supply input image data 60 to a non-high dynamic range specific block 48J, for example, without supplying the input image data 60 to a high dynamic range processing block 48K. Additionally, one or more of the non-high dynamic range specific blocks 48J may be instructed to output processed image data 62 to another non-high dynamic range specific block 48J or the electronic display 12, for example, without outputting the processing image data 62 to a high dynamic range processing block 48K.

Moreover, to facilitate improving power consumption efficiency, electrical power may be selectively supplied to each of the image data processing blocks 48 during a pass based at least in part on characteristics of the electronic display 12 coupled to the display pipeline 36B. In other words, electrical power may be selectively supplied to each of the image data processing blocks 48 based at least in part on which of the multiple selectable data paths 64 is implemented during the pass. For example, when the second (e.g., HDR or primary) data path 64 is implemented during a pass, electrical power may continuously be supplied to each of the image data processing blocks 48 during the pass. On the other hand, when the first (e.g., SDR only or bypass) data path 64 is implemented during a pass, electrical power may continuously be supplied to the non-high dynamic range specific blocks 48J, for example, without supplying electrical power to the high dynamic range processing blocks 48K. In this manner, the techniques disclosed herein may be tailored to facilitate improving operational flexibility and/or power consumption efficiency of a display pipeline 36B and, thus, an electronic device 10 in which the display pipeline 36B is implemented.

Figure 10:
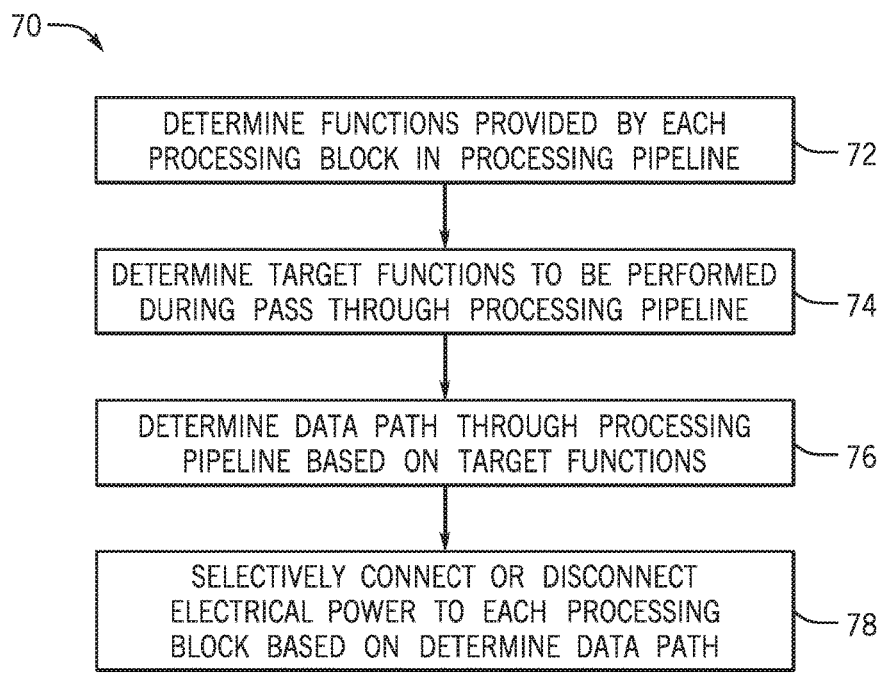
FIG. 10 is a flow diagram of a process for implementing the image data processing pipeline of FIG. 6, in accordance with an embodiment.

An example of a process 70 for operating pipelined circuitry (e.g., an image data processing pipeline 36) is described in FIG. 10. Generally, the process 70 includes determining functions provided by each processing block in a processing pipeline (process block 72), determining targeted functions to be performed during a pass through the processing pipeline (process block 74), determining a data path through the processing pipeline based on the target functions (process block 76), and selectively connecting or disconnecting electrical power to each of the processing blocks based on the determined data path (process block 78). In some embodiments, the process 70 may be implemented by executing instructions stored in a tangible non-transitory computer-readable medium, such as the controller memory 44, using processing circuitry, such as the controller processor 42.

Thus, in some embodiments, the controller 40 may determine functions provided by each image data processing block 48 implemented in an image data processing pipeline 36 (process block 72). To determine function provided by an image data processing block 48, in some embodiments, the controller 40 may poll the image data processing block 48 and/or the image data processing pipeline 36. Additionally or alternatively, the function provided by an image data processing block 48 may be predetermined and stored in a tangible, non-transitory, computer-readable medium, such as the controller memory 44, the external memory 38, and/or the internal memory 50 of the image data processing pipeline 36. Thus, in such embodiments, the controller 40 may determine the function provided by the image data processing block 48 by polling (e.g., reading) the tangible, non-transitory, computer-readable medium.

Additionally, the controller 40 may determine target functions to be performed during a pass through the image data processing pipeline 36 (process block 74). In some embodiments, functions targeted for performance during a pass may be input to the controller 40, for example, via the processor core complex 18, the image processing circuitry 27, the input devices 14, and/or the input/output ports 16. Additionally or alternatively, target functions to be performed during a pass through a display pipeline 36B may be determined based at least in part on characteristics of an electronic display 12 coupled to the display pipeline 36B.

Figure 11:
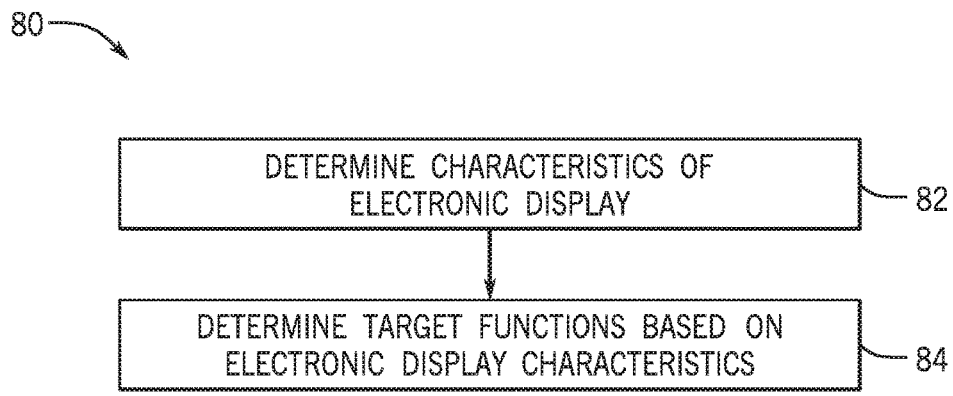
FIG. 11 is a flow diagram of a process for determining target functions to be provide during a pass through the display pipeline of FIG. 6, in accordance with an embodiment.

To help illustrate, an example of a process 80 for determining target functions to be performed during a pass through a display pipeline 36B is described in FIG. 11. Generally, the process 80 includes determining characteristics of an electronic display (process block 82) and determining target functions to be performed based on the characteristics of the electronic display (process block 84). In some embodiments, the process 80 may be implemented by executing instructions stored in a tangible non-transitory computer-readable medium, such as the controller memory 44, using processing circuitry, such as the controller processor 42.

Thus, in some embodiments, the controller 40 may determine characteristics of an electronic display 12 coupled to a display pipeline 36B (process block 82). As described above, characteristics of an electronic display 12 may include color gamut of its display panel and, thus, whether the electronic display 12 is suitable for display of high dynamic range content. Additionally or alternatively, the characteristics of an electronic display 12 may include resolution of the electronic display 12, layout of sub-pixels on its display panel, supported refresh rates, and/or the like.

In some embodiments, the controller 40 may determine characteristics of an electronic display 12 by polling the electronic display 12. Additionally or alternatively, the characteristics of the electronic display 12 may be input to the controller 40, for example, via the processor core complex 18, the image processing circuitry 27, the input devices 14, and/or the input/output ports 16. Furthermore, in some embodiments, the characteristics of the electronic display 12 may be predetermined and stored in a tangible, non-transitory, computer-readable medium, such as the controller memory 44, the external memory 38, and/or the internal memory 50 of the image data processing pipeline 36. Thus, in such embodiments, the controller 40 may determine the characteristics of the electronic display 12 by polling (e.g., reading) the tangible, non-transitory, computer-readable medium.

Based at least in part on the characteristics of the electronic display 12, the controller 40 may determine target functions to be performed during passes through a display pipeline 36B coupled to the electronic display 12 (process block 84). For example, when the characteristics are indicative of the electronic display 12 being suitable for display of high dynamic range content, the controller 40 may determine that the target functions include high dynamic range functions. On the other hand, when the characteristics are indicative of the electronic display 12 not being suitable for display of high dynamic range content, the controller 40 may determine that the target functions do not include the high dynamic range functions. In this manner, target functions to be performed during passes through a display pipeline 36B may be determined.

Returning to the process 70 of FIG. 10, the controller 40 may determine a data path 64 to be implemented during a pass through the image data processing pipeline 36 based at least in part on the functions provided by its image data processing blocks 48 and/or the functions targeted for performance during the pass (process block 76). As described above, in some embodiments, an image data processing pipeline 36 may include multiple selectable data paths 64. For example, an image data processing pipeline 36 may include a selectively implementable bypass data path 64 and a selectively implementable primary data path 64 and, thus, the controller 40 may determine whether to implement the bypass data path 64 or the primary data path 64 during a pass though the image data processing pipeline 36.

Figure 12:
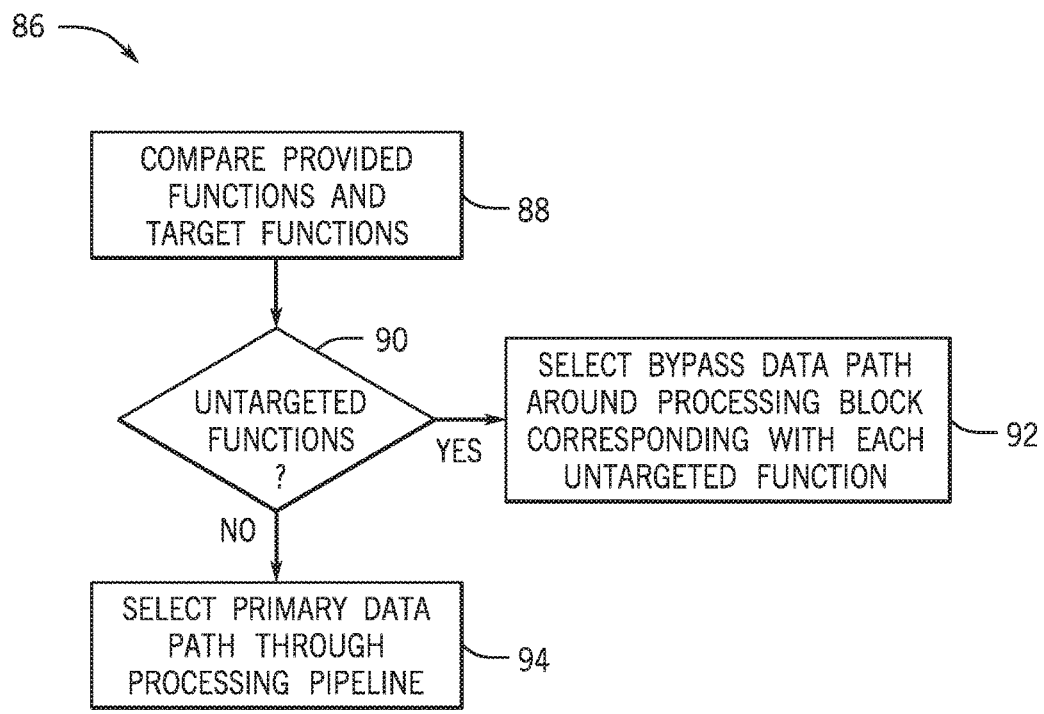
FIG. 12 a flow diagram of a process for determining one or more data paths through the image data processing pipeline of FIG. 6, in accordance with an embodiment.

An example of a process 86 for selecting a data path through pipelined circuitry (e.g., an image data processing pipeline 36) is described in FIG. 12. Generally, the process 86 includes comparing provided functions and target functions (process block 88), determining whether there are untargeted functions (decision block 90), selecting a bypass path around processing blocks corresponding with each untargeted function when there are untargeted functions (process block 92), and selecting a primary data path through a processing pipeline when there are not untargeted functions (process block 94). In some embodiments, the process 86 may be implemented by executing instructions stored in a tangible non-transitory computer-readable medium, such as the controller memory 44, using processing circuitry, such as the controller processor 42.

Thus, in some embodiments, the controller 40 may compare functions provided by image data processing blocks 48 implemented in an image data processing pipeline 36 with target functions to be performed during a pass through the image data processing pipeline 36 (process block 88). In this manner, the controller 40 may determine whether any of the functions provided by the image data processing blocks 48 are not targeted for performance during the pass (decision block 90). For example, when the target functions include a rotate function and the provided functions include the rotate function and a scale function, the controller 40 may determine that the scale function is untargeted.

When each of the provided functions is targeted for performance, the controller 40 may select a primary data path 64 through the image data processing pipeline 36 and instruct the image data processing pipeline 36 to implement the primary data path 64 (process block 94). For example, with regard to FIG. 8, the controller 40 may select the data path 64 through the memory-to-memory scaler/rotator pipeline 36A, which couples an output of the direct memory access block 46 to an input of the rotator block 48C, an output of the rotator block 48C to an input of the convert block 48D, an output of the convert block 48D to an input of the scaler block 48E, an output of the scaler block 48E to an input of the color manager block 48F, an output of the color manager block 48F to an input of the revert block 48G, an output of the revert block 48G to an input of the dither block 48H, and an output of the dither block 48H to an input of the direct memory access block 46. To implement the selected data path 64, the controller 40 may instruct the rotator block 48C to output processed image data 62 to the convert block 48D, for example, via a selection control signal 68 supplied to a de-multiplexer 66 in the rotator block 48C.

Returning to the process 86 of FIG. 12, when one or more of the provided functions is untargeted, the controller 40 may select a bypass path around image data processing blocks 48 that provide untargeted functions and instruct the image data processing pipeline 36 to implement the bypass data path 64 (process block 92). For example, with regard to FIG. 8, the controller 40 may select the data path 64 through the memory-to-memory scaler/rotator pipeline 36A, which couples an output of the direct memory access block 46 to an input of the rotator block 48C and an output of the rotator block 48C to an input of the direct memory access block 46, when a scale function is untargeted. To implement the selected data path 64, the controller 40 may instruct the rotator block 48C to output processed image data 62 to the direct memory access block 46, for example, via a selection control signal 68 supplied to a de-multiplexer 66 in the rotator block 48C.

Additionally, when a rotate function and a scale function are both untargeted, the controller 40 may select the data path 64 through the memory-to-memory scaler/rotator pipeline 36A, which couples an output of the direct memory access block 46 to an input of the statistics block 48I and an output of the statistics block 48I to an input of the direct memory access block 46. As described above, in some embodiments, the direct memory access block 46 may include a de-multiplexer 66. Thus, to implement the selected data path 64 in such embodiments, the controller 40 may instruct the direct memory access block 46 to supply input image data 60 directly to the statistics block 48I, for example, via a selection control signal 68 supplied to a de-multiplexer 66 in the direct memory access block 46.

In this manner, a subset of multiple data paths 64 through an image data processing pipeline 36 may be selectively implemented during passes through the image data processing pipeline 36, which may facilitate improving operational flexibility by enabling the image data processing pipeline 36 to dynamically adjust functions performed during different passes. To facilitate selectively connecting and disconnecting electrical power, in some embodiments, status of image data processing blocks 48 may be tracked based at least in part on the selected data path 64. For example, when the selected data path 64 passes through an image data processing block 48, status of the image data processing block 48 may indicate that the image data processing block 48 is operational. On the other hand, when the selected data path 64 does not pass through an image data processing block 48, status of the image data processing block 48 may indicate that the image data processing block 48 is bypassed. In some embodiments, the controller 40 may store the status of each image data processing block 48 implemented in an image data processing pipeline 36 in a tangible, non-transitory, computer-readable medium, such as the controller memory 44, the external memory 38, and/or the internal memory 50 of the image data processing pipeline 36.

Figure 13:
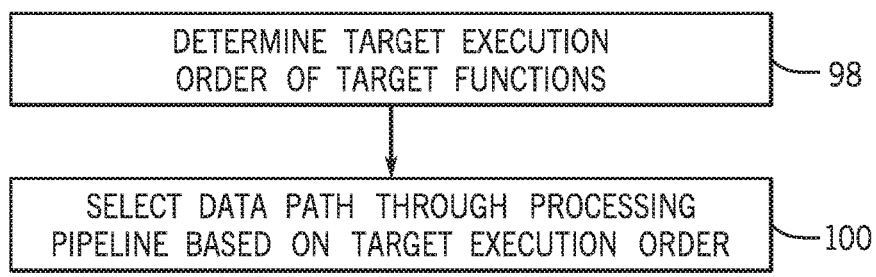
FIG. 13 is a flow diagram of another process for determining one or more data paths through the image data processing pipeline of FIG. 6, in accordance with an embodiment.

Another example of a process 96 for selecting a data path through pipelined circuitry (e.g., an image data processing pipeline 36) is described in FIG. 13. Generally, the process 96 includes determining target execution order of target functions (process block 98) and selecting a data path through a processing pipeline based on the target execution order (process block 100). In some embodiments, the process 96 may be implemented by executing instructions stored in a tangible non-transitory computer-readable medium, such as the controller memory 44, using processing circuitry, such as the controller processor 42.

Thus, in some embodiments, the controller 40 may determine target execution order of functions targeted for performance during a pass through an image data processing pipeline 36 (process block 98). In some embodiments, target execution order of the target functions may be input to the controller 40, for example, via the processor core complex 18, the image processing circuitry 27, the input devices 14, and/or the input/output ports 16. Additionally, in some embodiments, target execution order of the target functions may be one of multiple predetermined execution orders. For example, in a display pipeline 36B, a first execution order may include performing a sub-pixel uniformity compensation (SPUC) function followed by a dithering function and a second execution order may include performing the dithering function followed by the sub-pixel uniformity compensation function.

Based at least in part on the target execution order, the controller 40 may select one or more data paths 64 through the image data processing pipeline 36 and instruct the image data processing pipeline 36 to implement the one or more data paths 64 (process block 100). For example, when the first execution order is targeted for a pass through a display pipeline 36B, the controller 40 may select a first data path that couples an output of the pixel response correction (PRC) block to an input of the a sub-pixel uniformity compensation (SPUC) block and an output of the sub-pixel uniformity compensation block to an input of the dithering block. On the other hand, when the second execution order is targeted for a pass through a display pipeline 36B, the controller 40 may select a second data path that couples an output of the pixel response correction (PRC) block to an input of the dithering block and an output of the dithering block to an input of the sub-pixel uniformity compensation block. In this manner, a subset of multiple data paths 64 through an image data processing pipeline 36 may be selectively implemented, which may facilitate improving operational flexibility by enabling the image data processing pipeline 36 to dynamically adjust execution order of functions performed during different passes.

Returning to the process 70 of FIG. 10, the controller 40 may selectively connect and disconnect electrical power to the image data processing blocks 48 based at least in part on the selected data path 64 (process block 78). As described above, in some embodiments, a status for each image data processing blocks 48 in an image data processing pipeline 36 may be set based at least in part on a selected data path 64. Additionally, as described above, electrical power may be connected to an image data processing block 48 or disconnected from the image data processing block 48 during a pass based at least in part on its corresponding status.

Figure 14:
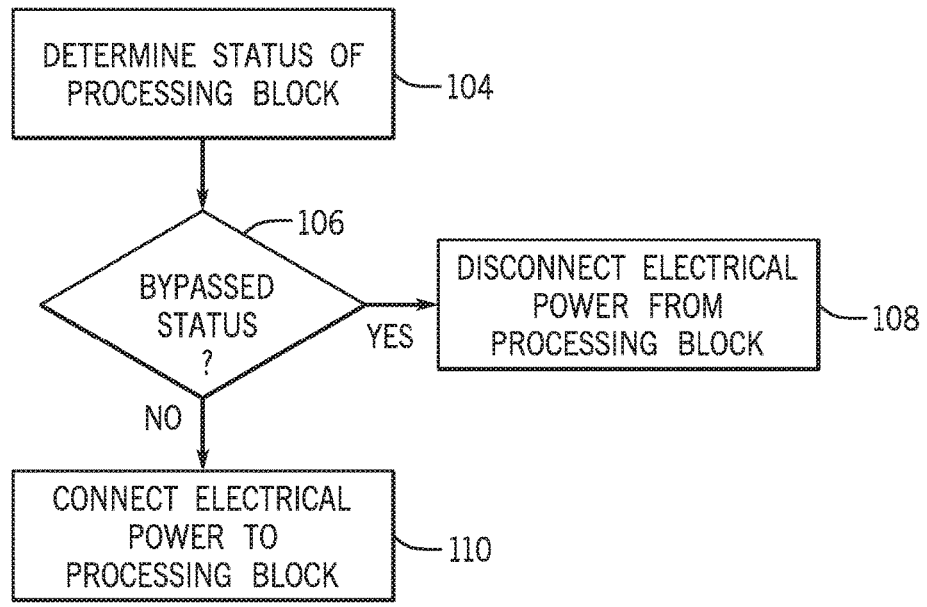
FIG. 14 is a flow diagram of a process for selectively connecting or disconnecting electrical power to the image data processing block of FIG. 7, in accordance with an embodiment.

To help illustrate, an example of a process 102 for selectively supplying electrical power to an image data processing block 48 is described in FIG. 14. Generally, the process 102 includes determining status of a processing block (process block 104), determining whether the status is a bypassed status (decision block 106), disconnecting electrical power from the processing block when the status is the bypassed status (process block 108), and connecting electrical power to the processing block when the status is not the bypasses status (process block 110). In some embodiments, the process 102 may be implemented by executing instructions stored in a tangible non-transitory computer-readable medium, such as the controller memory 44, using processing circuitry, such as the controller processor 42.

Thus, in some embodiments, the controller 40 may determine status of an image data processing block 48 (process block 104). As described above, in some embodiments, the status of an image data processing block 48 may be stored in a tangible, non-transitory, computer-readable medium, such as the controller memory 44, the external memory 38, and/or the internal memory 50. Thus, in such embodiments, the controller 40 may determine status of the image data processing block 48 by polling (e.g., reading) the tangible, non-transitory, computer-readable medium. Additionally, as described above, an image data processing block 48 may have an operational status when a selected data path 64 passes through the image data process block 48 and a bypassed status when the selected data path 64 does not pass through the image data processing block 48.

Thus, when the status is not a bypassed status, the controller 40 may determine that the image data processing block 48 is expected to be operational during a pass and, thus, instruct the electronic device 10 to connect electrical power to the image data processing block 48 during the pass (process block 110). To connect electrical power, in some embodiments, the controller 40 may instruct a switching device 54 electrically coupled between the image data processing block 48 and the power source 26 to maintain a closed position, for example, via a gating control signal 56. On the other hand, when the status is a bypassed status, the controller 40 may determine that the image data processing block 48 is not expected to be operational during the pass and, thus, instructed the electronic device 10 to disconnect electrical power from the image data processing block 48 during the pass (process block 108). To disconnect electrical power, in some embodiments, the controller 40 may instruct a switching device 54 electrically coupled between the image data processing block 48 and the power source 26 to maintain an open position, for example, via a gating control signal 56.

In a similar manner, electrical power may be selectively connected or disconnected from each image data processing block 48 during a pass through the image data processing pipeline 36. As described above, controlling supply of electrical power in this manner may facilitate improving power consumption efficiency of the image data processing pipeline 36, for example, by enabling power consumption to be reduced when one or more image data processing blocks 48 is bypassed by a selected data path 64. With this understanding, the technical effects of the techniques described in the present disclosure include improving operational flexibility and/or power consumption efficiency of an image data processing pipeline 36 and, thus, an electronic device 10 in which the image data processing pipeline 36 is implemented.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   an electronic display configured to display an image based at least in part on display image data; and
   an image data processing pipeline configured to process input image data corresponding with the image to facilitate determining the display image data such that perceived image quality is improved when the image is displayed on the electronic display, wherein the image data processing pipeline comprises:
   a rotator block configured to generate first processed image data at a first output by performing a rotate function on the input image data when the rotator block receives the input image data;
   other one or more processing blocks coupled to the first output comprising:
      a scaler block;
      a convert block coupled between the rotator block and the scaler block; and
      a revert block coupled to the scaler block;
      wherein at least a portion of the other one or more processing blocks are configured to generate second processed image data at a second output by performing a second function on the first processed image data when the other one or more processing blocks receive the first processed image data; and
   a subsequent processing block coupled to the first output and the second output, wherein the subsequent processing block is configured to:
      perform a third function on the first processed image data when the subsequent processing block receives the first processed image data to generate a third processed image data; and
      perform the third function on the second processed image data when the subsequent processing block receives the second processed image to generate a subsequent processed image data.

2. The electronic device of claim 1, wherein:
   the rotator block comprises first image data processing circuitry implemented to perform the rotate function on image data when electrical power is supplied to first image data processing circuitry;
   the scaler block comprises second image data processing circuitry implemented to perform the second function on image data when electrical power is supplied to the second image data processing circuitry; and
   the subsequent processing block comprises third image data processing circuitry implemented to perform the third function on image data when electrical power is supplied to the third image data processing circuitry, wherein the third function is different from the rotate function and the second function.

3. The electronic device of claim 1, wherein the rotator block comprises:
   image data processing circuitry coupled to a first input of the rotator block, wherein the image data processing circuitry is configured to perform the rotate function on the input image data during a pass through the image data processing pipeline; and
   a de-multiplexer coupled between the image data processing circuitry and the first output of the rotator block, wherein the de-multiplexer is configured to output the first processed image data to only one of the scaler block and the subsequent processing block during the pass through the image data processing pipeline.

4. The electronic device of claim 1, wherein:
   the image data processing pipeline comprises a display pipeline coupled to the electronic display; and
   the display pipeline is configured to:
      determine the display image data based at least in part on the third processed image data; and
      output the display image data to the electronic display to enable the electronic display to display the image based at least in part on the display image data.

5. The electronic device of claim 4, wherein:
   an additional processing block is configured to perform a high dynamic range specific function; and
   the rotator block, the other one or more processing blocks, the subsequent processing block, or a combination thereof is configured to:
      output the first processed image data to the additional processing block when the electronic display is implemented to display high dynamic range content; and
      output the first processed image data to another additional processing block when the electronic display is not implemented to display high dynamic range content.

6. The electronic device of claim 1, wherein:
the image data processing pipeline comprises a memory-to-memory scaler/rotator pipeline; and
the subsequent processing block comprises a statistics block configured to determine statistics data indicative of characteristics of the image by at least:
  performing a statistics function on the first processed image data when the statistics block receives the first processed image data output from the rotator block; and
  performing the statistics function on the third processed image data when the scaler block receives the first processed image data output from the rotator block.

7. The electronic device of claim 6, wherein:
the convert block is configured to convert the first processed image data from a source format to an internal format before outputting the first processed image data to the scaler block; and
the revert block is coupled between the scaler block and the statistics block, wherein the revert block is configured to convert the second processed image data from the internal format to the source format before outputting the second processed image data to the statistics block; and
the rotator block is configured to output the first processed image data to the convert block only when a scale function of the scaler block is targeted to be performed during a pass through the memory-to-memory scaler/rotator pipeline.

8. The electronic device of claim 6, comprising external memory coupled to the memory-to-memory scaler/rotator pipeline via a communication bus, wherein:
the memory-to-memory scaler/rotator pipeline comprises a direct memory access block coupled between the communication bus and the rotator block and between the communication bus and the statistics block, wherein the direct memory access block is configured to:
  retrieve the input image data from the external memory; and
  output the input image data to the rotator block when the rotate function is targeted to be performed during a pass through the memory-to-memory scaler/rotator pipeline; and
  output the input image data to the statistics block when only the statistics function is targeted to be performed during the pass through the memory-to-memory scaler/rotator pipeline; and
the statistics block is configured to:
  determine the statistics data indicative of the characteristics of the image by performing the statistics function on the input image data when the statistics block receives the input image data from the direct memory access block; and
  output the statistics data indicative of the characteristics of the image to the direct memory access block to enable the direct memory access block to store the statistics in the external memory.

9. The electronic device of claim 1, wherein the image data processing pipeline comprises:
a first circuit connection coupled between the first output of the rotator block and an input of the scaler block, wherein the first circuit connection is configured to enable the rotator block to output the first processed image data directly to the scaler block; and
a second circuit connection coupled between the first output of the rotator block and a third input of the subsequent processing block, wherein the second circuit connection is configured to enable the rotator block to output the first processed image data directly to the subsequent processing block.

10. The electronic device of claim 1, wherein:
the subsequent processing block comprises a third output coupled to a second input of the other one or more processing blocks, wherein the subsequent processing block is configured to generate third processed image data by performing the third function on the first processed image data when the subsequent processing block receives the first processed image data from the other one or more processing blocks;
the other one or more processing blocks comprise the second output and is configured to generate the second processed image data by performing the second function on the third processed image data when at least a portion of the other one or more processing blocks receive the third processed image data from the subsequent processing block; and
the rotator block is configured to:
  output the first processed image data directly to at least a portion of the other one or more processing blocks when target execution order corresponding with a pass through the image data processing pipeline indicates that the second function is targeted to be performed before the third function; and
  output the first processed image data directly to the subsequent processing block when the target execution order corresponding with the pass indicates that the third function is targeted to be performed before the second function.

11. The electronic device of claim 1, comprising:
a first switching device electrically coupled between the rotator block and a power source, wherein the first switching device is configured to:
  maintain a closed position during a pass through the image data processing pipeline to enable supply of electrical power from the power source to the rotator block when the first function is targeted to be performed during the pass; and
  maintain an open position during the pass to block supply of electrical power from the power source to the rotator block when the first function is not targeted to be performed during the pass;
a second switching device electrically coupled between at least a portion of the other one or more processing blocks and the power source, wherein the second switching device is configured to:
  maintain the closed position during the pass through the image data processing pipeline to enable supply of electrical power from the power source to at least a portion of the other one or more processing blocks when the second function is targeted to be performed during the pass; and
  maintain the open position during the pass to block supply of electrical power from the power source to at least a portion of the other one or more processing blocks when the second function is not targeted to be performed during the pass; and
a third switching device electrically coupled between the subsequent processing block and the power source, wherein the third switching device is configured to:
  maintain the closed position during the pass through the image data processing pipeline to enable supply of electrical power from the power source to the subsequent processing block when the third function is targeted to be performed during the pass; and maintain the open position during the pass to block supply of electrical power from the power source to the subsequent processing block when the third function is not targeted to be performed during the pass.

12. The electronic device of claim 1, comprising a controller communicatively coupled to the image data processing pipeline, wherein the controller is configured to:

determine target functions corresponding with a pass through the image data processing pipeline, wherein the target functions comprise functions expected to be performed during the pass; and instruct the rotator block to:
output the first processed image data to at least a portion of the other one or more processing blocks during the pass when the second function is included in the target functions; and output the first processed image data to the subsequent processing block during the pass when the second function is not included in the target functions.

13. The electronic device of claim 12, wherein the controller is configured to instruct the electronic device to:

connect electrical power to at least a portion of the other one or more processing blocks during the pass through the image data processing pipeline when the second function is included in the target functions; and disconnect electrical power from at least a portion of the other one or more processing blocks during the pass when the second function is not included in the target functions.

14. The electronic device of claim 1, wherein the electronic device comprises a portable phone, a media player, a personal data organizer, a handheld game platform, a tablet device, a computer, or any combination thereof.

15. A method for processing image data corresponding with an image to be displayed on an electronic display, comprising:

determining, using a controller, provided functions of a processing pipeline comprising a plurality of processing blocks, wherein each of the plurality of processing blocks comprises image data processing circuitry implemented to perform one of the provided functions when supplied electrical power, wherein the plurality of processing blocks comprises a rotator block, a scalar block, a convert block coupled between the rotator block and the scalar block, a revert block coupled to the scalar block, and a subsequent processing block coupled to a first output of the rotator block and a second output of the revert block;

determining, using the controller, characteristics of the electronic display;

determining, using the controller, target functions corresponding with a pass through the processing pipeline, wherein the target functions comprise functions expected to be performed during the pass based at least in part on the characteristics of the electronic display; and when each of the provided functions is not included in the target functions:

instructing, using the controller, the processing pipeline to implement a first data path that bypasses one or more processing blocks of the plurality of processing blocks and passes through remaining processing blocks of the plurality of processing blocks;

instructing, using the controller, the processing pipeline to enable supply of electrical power to each of the remaining processing blocks during the pass to enable the processing pipeline to perform the target functions on the image data corresponding with the image to facilitate improving perceived image quality when the image is displayed on the electronic display; and instructing, using the controller, the processing pipeline to block supply of electrical power from the one or more processing blocks bypassed by the first data path to facilitate improving power consumption efficiency of the processing pipeline.

16. The method of claim 15, comprising, when each of the provided functions is included in the target functions:

instructing, using the controller, the processing pipeline to implement a second data path that passes through each of the plurality of processing blocks during the pass; and instructing, using the controller, the processing pipeline to supply electrical power to each of the plurality of processing blocks during the pass to enable the processing pipeline to perform each of the provided functions on the image data corresponding with the image.

17. The method of claim 15, wherein:

instructing the processing pipeline to implement the first data path comprises:

determining that the rotator block of the plurality of processing blocks comprises first image data processing circuitry implemented to provide a first function included in the target functions;

determining that the scalar block, the convert block, the revert block, or a combination thereof of the plurality of processing blocks comprises second image data processing circuitry implemented to provide a second function not included in the target functions, wherein a first circuit connection is coupled between the scalar block, the convert block, the revert block, or a combination thereof and the rotator block;

determining that the subsequent processing block of the plurality of processing blocks comprises third image data processing circuitry implemented to provide a third function included in the target functions, wherein a second circuit connection is coupled between the subsequent processing block and the rotator block; and instructing the rotator block to output processed image data only to the second circuit connection via a selection control signal;

instructing the processing pipeline to enable supply of electrical power to each of the remaining processing blocks comprises:

instructing a first switching device electrically coupled between the rotator block and a power source to maintain a closed position via a first gating control signal; and instructing a second switching device electrically coupled between the subsequent processing block and the power source to maintain the closed position via a second gating control signal; and instructing the processing pipeline to block supply of electrical power from the one or more processing blocks comprises instructing a third switching device electrically coupled between the scalar block, the convert block, the revert block, or a combination thereof and the power source to maintain an open position via a third gating control signal.

18. A tangible, non-transitory, computer-readable medium storing instructions executable by one or more processors of an electronic device, wherein the instructions comprise instructions to:

determine, using the one or more processors, provided functions of a processing pipeline comprising a plurality of processing blocks, wherein each of the plurality of processing blocks comprises image data processing circuitry implemented to perform one of the provided functions when supplied electrical power, wherein the plurality of processing blocks comprises a rotator block, a scalar block, a convert block coupled between the rotator block and the scalar block, a revert block coupled to the scalar block, and a subsequent processing block coupled to a first output of the rotator block and a second output of the revert block;

determine, using the one or more processors, characteristics of an electronic display of the electronic device;

determine, using the one or more processors, a target execution order of the provided functions to be implemented during a pass through the processing pipeline, wherein the target execution order is based at least in part on the characteristics of the electronic display;

select, using the one or more processors, a data path from multiple selectable data paths through the processing pipeline based at least in part on the target execution order; and instruct, using the one or more processors, the processing pipeline to implement the data path during the pass to enable the plurality of processing blocks to perform the provided functions on image data corresponding with an image in the target execution order to facilitate improving perceived image quality when the image is displayed on the electronic display.

19. The computer-readable medium of claim 18, wherein the instructions to determine the provided functions comprise instructions to:

determine that a first processing block of the plurality of processing blocks comprises first image data processing circuitry implemented to provide a first function, wherein the first processing block comprises the rotator block;

determine that a second processing block of the plurality of processing blocks comprises second image data processing circuitry implemented to provide a second function different from the first function, wherein a first circuit connection is coupled between a first output of the first processing block and a first input of the second processing block, wherein the second processing block comprises the convert block, the scalar block, the revert block, or a combination thereof;

determine that a third processing block of the plurality of processing blocks comprises third image data processing circuitry implemented to provide a third function different from the first function and the second function, wherein:

a second circuit connection is coupled between the first output of the first processing block and a second input of the third processing block;

a third circuit connection is coupled between a second output of the second processing block and the second input of the third processing block; and a fourth circuit connection is coupled between a third output of the third processing block and the first input of the second processing block.

20. The computer-readable medium of claim 19, wherein:

the instructions to select the data path from the multiple selectable data paths comprises instructions to:

select a first selectable data path when the target execution order indicates that the second function provided by the second processing block is expected to be performed before the third function provided by the third processing block; and select a second selectable data path when the target execution order indicates that the third function provided by the third processing block is expected to be performed before the second function provided by the second processing block; and the instructions to instruct the processing pipeline to implement the data path comprise instructions to:

instruct the first processing block to output first processed image data to the first circuit connection and the second processing block to output second processed image data to the third circuit connection when the first selectable data path is selected; and instruct the first processing block to output the first processed image data to the second circuit connection and the third processing block to output third processed image data to the fourth circuit connection when the second selectable data path is selected.

* * * * *